(12) United States Patent
Lastovica, Jr.

(10) Patent No.: US 7,376,674 B2
(45) Date of Patent: May 20, 2008

(54) STORAGE OF MULTIPLE PRE-MODIFICATION SHORT DURATION COPIES OF DATABASE INFORMATION IN SHORT TERM MEMORY

(75) Inventor: Norman Joe Lastovica, Jr., Salida, CO (US)

(73) Assignee: Oracle International Corporation, Redwood Shores, CA (US)

(*) Notice: Subject to any disclaimer, the term of this patent is extended or adjusted under 35 U.S.C. 154(b) by 478 days.

(21) Appl. No.: 10/845,730

(22) Filed: May 14, 2004

(65) Prior Publication Data

US 2006/0036655 A1    Feb. 16, 2006

(51) Int. Cl.
*G06F 17/30* (2006.01)

(52) U.S. Cl. .......................... 707/201; 707/10

(58) Field of Classification Search ................ 707/100, 707/10, 200, 201, 204; 709/203
See application file for complete search history.

(56) References Cited

U.S. PATENT DOCUMENTS 5,956,713 A * 9/1999 Bamford et al. ............... 707/8
6,829,617 B2 * 12/2004 Sawdon et al. ............. 707/102

* cited by examiner

*Primary Examiner*—Cheryl Lewis
(74) *Attorney, Agent, or Firm*—Hickman Palermo Truong & Becker LLP

(57) ABSTRACT

A method and apparatus for storing snapshots (pre-modification copies of data) in short term memory is disclosed. In an embodiment, if short term storage is clogged, snapshot chains are copied to longer term memory. In an embodiment, snapshot chains that are older than any active transaction are discarded, and the storage space which the discarded snapshot chains occupy is reclaimed. In an embodiment, the snapshots are stored in chains in which the snapshots are ordered chronologically, and each snapshot is explicitly linked to the next oldest snapshot (if one exists) in the snapshot chain.

32 Claims, 2 Drawing Sheets

STORAGE OF MULTIPLE PRE-MODIFICATION SHORT DURATION COPIES OF DATABASE INFORMATION IN SHORT TERM MEMORY

FIELD OF INVENTION

The field of invention is related to use of short term memory in general. More specifically, the field of invention is related to maintaining data consistency in short term memory.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, the problems identified with an approach should not be assumed to have been recognized in the prior art, unless otherwise indicated.

For convenience of expression, various entities that represent sets of instructions (e.g. functions, queries) are described as performing actions, when in fact, a computer, process, database server, or other executing entity performs those actions in response to executing or interpreting the set of instructions. For example, a function may be described as determining that a condition exists or a query may be described as accessing information. These are just convenient ways of expressing that a computer, process, database server or other executing entity is determining that a condition exists in response to executing a function or is accessing data in response to executing or computing a query.

A Database Management System (DBMS) stores data in a database in one or more data containers, each container contains records, and the data within each record is organized into one or more fields. In a DBMS that stores data in a relational database, the data containers are referred to as tables, the records are referred to as rows, and the attributes are referred to as columns. In object oriented databases, the data containers are referred to as object classes, the records are referred to as objects, and the attributes are referred to as object attributes. Other database architectures may use other terminology.

The DBMS retrieves and manipulates data in response to receiving a database statement. Typically, the database statement conforms to a database language (or query language), such as Structured Query Language (SQL). A database statement can specify a query operation, a data manipulation operation, or a combination thereof. A database statement that specifies a query operation is referred to herein as a query. The present invention is not limited to database statements that specify a particular type of operation. However, for the purpose of explanation, embodiments of the present invention are illustrated using queries.

Typically, changes to database systems are made using transaction processing. A transaction is a set of operations that change data. In a DBMS, the operations are specified by one or more database commands. Two types of transaction are read-only transaction and read-write transactions. Read-only transactions read data and may copy the data read to another location, without modifying the original data or the location of the original data. Read-write transactions may read or modify data. Committing a transaction refers to making the changes for a transaction permanent. For example, if a read-only transaction copies data, the read-only transaction commits once the copy of the data being read is complete and permanent. Under transaction processing, all the changes for a transaction are made atomically. When a transaction is committed, either all changes are committed, or the transaction is rolled back.

In transaction processing, changes to a database are applied as transactions in a way that preserves four properties. These properties are referred to as ACID properties. ACID is an acronym for Atomicity, Consistency, Isolation, and Durability. The ACID properties are defined as follows.

Atomicity: A transaction should be done or undone completely and unambiguously.

Consistency: A transaction should preserve invariant properties (such as integrity constraints) defined on the data. On completion of a successful transaction, the data should evolve from one consistency state to another.

Isolation: Each transaction should appear to execute independently of other transactions that may be executing concurrently in the same environment. The effect of executing a set of transactions serially should be the same as that of running them concurrently. This requires during the course of a transaction, that intermediate (possibly inconsistent) states of the data should not be exposed to any other transactions. Consequently, transactions must not be able to see the changes made by concurrently executing transactions until those transactions have been completed as an atomic unit and made persistent, i.e. committed.

Durability: The effects of a completed transaction should always be persistent.

In order to provide ACID consistent database views for a read-only transaction, copies of database rows (and index nodes) are captured and stored on disk by read-write transactions prior to modification, which are referred to as pre-modification copies. Specifically, a pre-modification copy of a row is a copy of the row made by a transaction or process prior to modifying (e.g., inserting, changing, or deleting) the row; the copy is referred to herein as snapshots or snapshot records. These snapshots of the rows are accessed by read-only transactions. In this fashion, declared read-only transactions (that can never modify the database) do not need to lock or otherwise restrict declared read-write transactions that modify the database and coordinate access with other read-write transactions with various levels of locks on rows and index nodes.

The snapshot copies of the database rows are stored in snapshot pages of a snapshot shot storage area on disk. The snapshot pages are chained from one to the next. Each snapshot page can hold one or more snapshots from different rows from the same live database page. Slower non-volatile memory (e.g., a disk) is used for the snapshot storage rather than faster volatile memory, because the amount storage space needed for the snapshot storage can exceed the amount of volatile memory available on many computer systems. However, because a snapshot can be accessed far more quickly and efficiently if it were stored in volatile memory, a mechanism that permits this is highly desirable.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
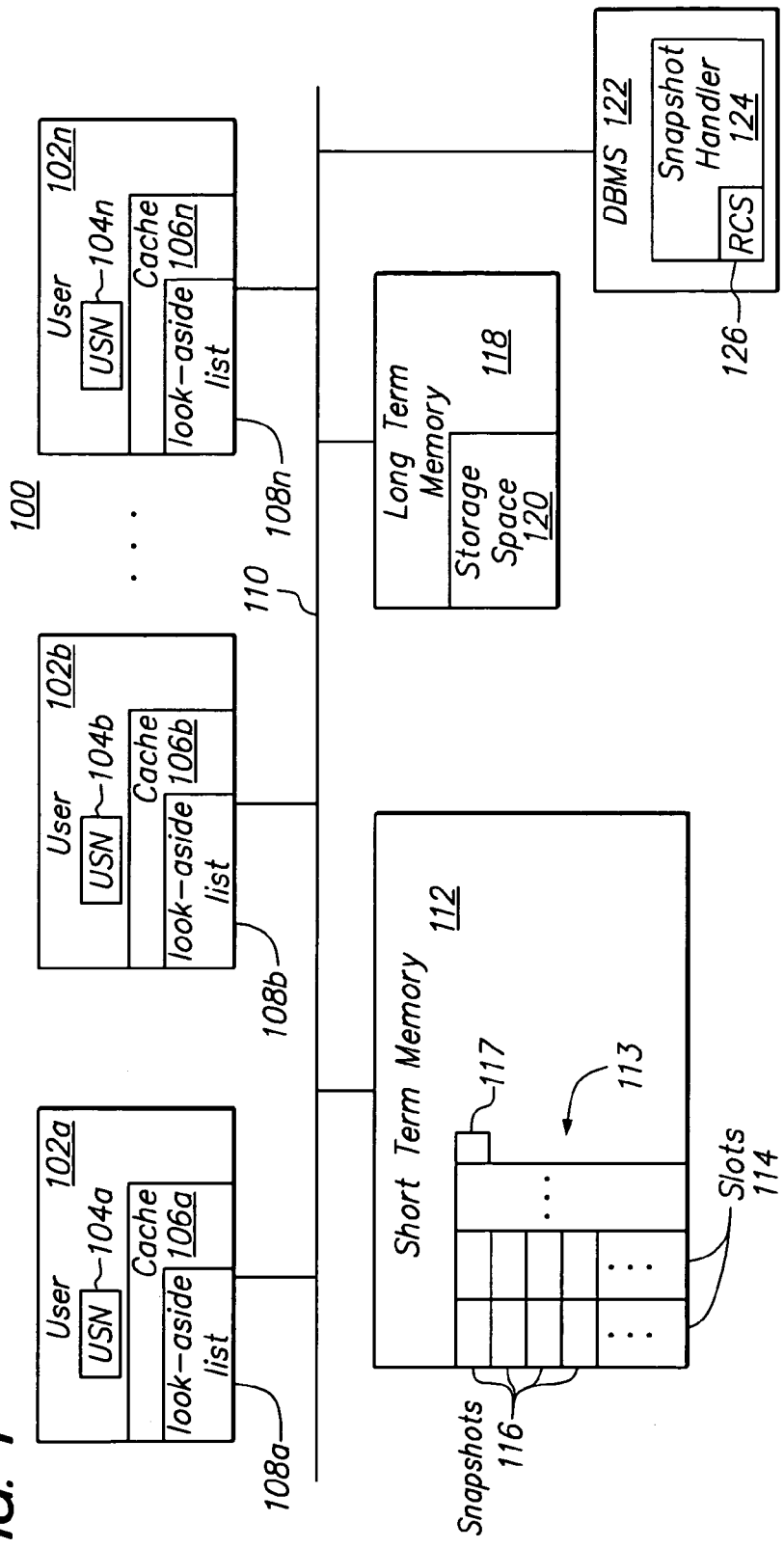
FIG. 1 shows a block diagram of an embodiment of a system for reading from and writing to a database.

A method and apparatus for storage of multiple pre-modification short duration copies (snapshots) of database information in short term memory is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature may not address any of the problems discussed above or may only address one of the problems discussed above. Some of the problems discussed above may not be fully addressed by any of the features described herein. Although headings are provided, information related to a particular heading, but not found in the section having that heading, may also be found elsewhere in the specification.

Functional Overview

A method and an apparatus are disclosed for storing snapshots in short term memory. In an embodiment, the method provides a reduced amount of contention for accessing data so that any degradation in the performance of the short term memory as a result of storing the snapshots is less than the degradation that would be present were the amount of contention the same as other possible methods having a higher amount of contention. Storing database rows (e.g., snapshots or live database rows) in short term memory improves application performance by reducing the number of database I/O operations to long term memory (e.g., persistent storage). Since snapshots are anticipated to have a relatively short lifetime, copies of database rows may be stored in low contention short term memory (e.g., random access main memory).

In order to reduce the amount of contention in the short term memory and also provide ACID consistent database views for a read-only transaction (that are non-changing for the life of the transaction), snapshots of database rows (and index nodes) are captured and stored in short term memory by read-write transactions prior to modification. In this fashion, declared read-only transactions (that can never modify the database) do not lock or otherwise restrict declared read-write transactions (that modify the database and coordinate access with other read-write transactions with various levels of locks on rows and index nodes), thereby reducing the amount of contention.

By using a pre-allocated section of shared short term memory to store snapshots, read-write transactions can store snapshots with no database I/O to long term memory and without locking the copies of rows. The snapshot information is allowed to automatically "spill" from short term memory to long term memory so that the process does not stop or have errors returned to the user. Once the long term memory is needed, the performance may degrade as additional locking and disk I/Os are needed, but the performance is better than were short term memory not used at all. However, since usually all snapshots can be stored in short term memory, the degradation in performance due to using long term memory usually does not occur. After the pre-allocated section of short term memory fills, once the oldest transactions in the database commit, the oldest snapshot copies are no longer needed. Consequently, after the oldest transactions commit, short term memory is reclaimed allowing read-write transactions to store snapshot copies of rows in short term memory again.

Using short term memory for storing snapshots, permits read-write transactions to modify database rows essentially without (or without any) I/O to the database and essentially without (or without any) database page locking operations, potentially resulting in no I/O latency within the transaction. Read-only transactions may receive an ACID consistent view of the database without blocking and without being blocked by read-write transactions, and also avoid disk I/O and locking operations. By further avoiding disk I/O and database structure locking, application performance can be significantly improved. The database system may provide both read-write and read-only transactions with reduced latency for updating and reading rows from the database with potentially lower total CPU consumption.

An Embodiment of a System for Reading to and Writing From a Database

FIG. 1 shows a block diagram of an embodiment of a system 100 for reading from and writing to a database. System 100 includes users 102a-n. Users 102a-n associated with User Numbers (USNs) 104a-n and caches 106a-n having look-aside lists 108a-n, respectively. System 100 also includes communications line 110 and short term memory 112 including storage space 113 having slots 114, which store snapshots 116. Clogged flag 117 is also associated with storage space 113. Additionally system 100 has long term memory 118 having storage space 120. System 100 also includes DBMS 122 having snapshot handler 124, which may include Record Cache Server (RCS) 126. In alternative embodiments, system 100 may not have all of the components listed above or may have other components in addition to and/or instead of the components listed above.

System 100 is used for reading and writing rows in a database. System 100 stores snapshots of rows before they are modified so that applications reading a row are given an ACID consistent (e.g., an unchanging) view of the row. Users 102a-n, USNs 104a-n, caches 106a-n, look-aside lists 108a-n, communications line 110, short term memory 112, storage space 113, slots 114, store snapshots 116, clogged flag 117, long term memory 118, storage space 120, DBMS 122, and snapshot handler 124 are discussed in the sections below.

Users

Users 102a-n access a database. Users 102a-n may be separate personal computers, terminals, or workstations, for example, which are being used by different users. Also, users 102a-n may be different applications, processors, processes, and/or threads.

USNs 104a-n may be unique user identifiers having ascending values. USNs 104a-n are used to mark snapshots. Each of users 102a-n maintains its own USNs 104a-n, respectively. USNs 104a-n are incremented as each transaction starts. Caches 106a-n are local short term memories used by users 102a-n for storing records and or other information that is currently being accessed.

Local Look-Aside List

Look-aside lists 108a-n are lists of the last several database entries (e.g. rows) that were accessed by user 102a-n, respectively. Look-aside lists 108a-n may also be referred to as the Row Cache Working Set (RCWS). Each of users 102a-n maintains look-aside lists 108a-n in caches 106a-n. Look-aside lists 108a-n are stored in caches 106a-n, respectively. There is one look-aide list for each of users 102a-n. Each of look-aside lists 108a-n is private to its corresponding user (e.g., its corresponding user process). Each of look-aside lists 108a-n contains the last W entries in short term memory 112 that were accessed by the corresponding user. W may be a user-settable number, and may have a default value of 10, for example. The look-aside lists 108a-n may include a copy of the contents of the snapshot accessed and pointers to corresponding locations in other memories where the snapshots are stored. In an embodiment, accessing the most recently accessed W rows via look-aside list 108a-n is faster than accessing the actual memory location storing the snapshots, because the desired row can be accessed quicker. Whether the data stored in look-aside lists 108a-n is current may be tracked using USNs 104a-n.

Communication Line

Communication line 110 is the set of communications connections between users 102a-n, short term memory 112, and long term memory 118. Users 102a-n communicate via communication line 110 with short term memory 112 and long term memory 118. Communication line 110 may be any combination of a bus, a Local Area Network (LAN), and/or a Wide Area Network, for example. Communication line 110 may include any combination of copper wire, optical fiber, radio wave, and/or any other form of transmitting information, for example.

Short Term Memory

Short term memory 112 is shared by users 102a-n and may be a shared cache. Short term memory 112 may be volatile memory. In general short term memory 112 may be accesses more efficiently than long term memory. For example, the time required to access short term memory 112 is less than the time required to access system 100's long term memory. Short term memory 112 may be several short term memory devices and/or may divided into a number of short term memory locations located in one or more short term memory devices.

Snapshot Storage

Short term memory 112 includes storage space 113, where snapshots are stored. Snapshots 116 can be stored in globally accessible shared memory regions, such as storage space 113, which may be referred to as "Snapshots in Short term memory". Storage space 113 may be pre-allocated for storing snapshots 116. As the oldest transactions in the database commit, snapshot copies of rows (those of snapshots 116) that would be required for these transactions are no longer needed and the allocated space in memory can be reclaimed and reused for future snapshot copies. So long as the oldest transactions in the database are short enough in duration, and the total amount of data modification activity is low enough, there will be enough space in short term memory 112 to store all the snapshots for the entire lifetime of snapshots 116. Storage space 113 may encompass the entire short term memory 112 or may only include a portion of storage space 112. If storage space 113 is only a portion of short term memory 112, then storage space 113 may share short term memory 112 with other information stored in short term memory 112. Storage space 113 may have a fixed size. In an embodiment, storage space 113 may vary in size depending on how much space storage space 113 requires and how much space the other data stored in short term memory requires.

As transactions become longer and modification activity increases, the space in short term memory 112 for snapshots 116 becomes less available, because less space in storage space 113 becomes reclaimable. If storage space 113 fills, and there is still room in short term memory 112, storage space 113 may be expanded. Once one or more of the snapshots 116 stored in storage space 113 is old enough that the snapshot may be discarded, a corresponding amount of storage space 113 may be reclaimed. A check for whether there is reclaimable space in storage space 113 may be performed periodically, when storage space 113 is full, and/or when short term memory 112 is full.

Slots

Slots 114 store chains of snapshots of the same row. In an embodiment, each of slots 114 may contain zero, one, or more snapshots. Each of slots 114 stores one or zero snapshot chains. Snapshot chains are discussed further below in the section entitled "Snapshot Chains". Each of the snapshots stored in the same slot correspond to the same row in the database. If a given row does not already have a corresponding slot, before storing the snapshot of that row, a slot is reserved (or "allocated") in storage space 113 of short term memory 112 for that row. Allocating a slot may involve reserving an empty slot or reclaiming a slot storing snapshots that are no longer needed. In an embodiment, prior to performing a read-write transaction one of slots 114 or a group of slots 114 may be allocated to one of users 102a-n for future use.

Initially, the database administrator or DBMS 122 designates a number of slots 114 in short term memory 112. In an embodiment, periodically or if storage space 113 is clogged, storage space 113 may be reorganized by reclaiming storage space having snapshots that are no longer needed. Similarly, in an embodiment in which storage space 113 does not have a fixed size, storage space 113 may be periodically resized for a more optimal usage of storage space 112. Upon a resizing or reorganization of storage space 113 a given number of slots S are allocated. Some of the allocated slots may be left empty for later use.

In an embodiment, each of slots 114 has the same fixed length, which may be explicitly specified by the Database Administrator (DBA) or a default value may be used. The DBA may also specify the number of slots 114 for short term memory 112. The ideal number of slots 114 to allocate is based on a relationship including the transaction durations and the amount of database update activity. The database update activity may be characterized by the rate at which transactions are initiated and/or the average number of concurrently active transactions at any given moment. The longer the transaction duration, the longer the amount of time for which any of the slots 114 are needed. Similarly, the more transactions that are active concurrently, the greater the number of slots 114 that need to be allocated. In other words, Applications having a low update rate and/or a short duration of transactions need relatively few slots 114. Applications with high update rates and/or long duration transactions may need many slots 114. To reduce contention and the resulting additional processing time, the number of slots 114 allocated may be somewhat greater or significantly greater than the average number of transactions that occur concurrently. The greater the number of slots 114 that are allocated, the longer the time period until a transaction needs to wait for DBMS 122 to allocate new slots by, for example, reclaiming old slots.

Snapshots

Snapshots 116 are snapshots of rows of a database. Before writing to a row, a user copies the row as a snapshot and stores the snapshot in one of slots 114. In an embodiment, read-only transactions read snapshots 116, and are allowed to read the most recent one of snapshots 116 that will still provide an ACID consistent view of the database. In an embodiment, read-write transactions only write snapshots 116, but do not read snapshots 116.

Those of snapshots 116 that are older than any of the active transactions in which a write operation may be performed may be discarded, the space in which the discarded snapshots were stored may be reclaimed. Alternatively, storage space 113 may be rearranged, and an amount of space may be reclaimed that is equivalent in size to the portion of storage space 113 occupied by the snapshots that are old enough to be discarded.

In order to ensure that a read-only transaction is presented with an ACID consistent view, a row is not considered "visible" to a read-only transaction if it is written after the read-only transaction began. In this specification, the term "row incarnation" is generic to a copy of the actual current row or a snapshot of the row. When a snapshot is taken of a row the snapshot is tagged with the USN of the user reading the row. A read-only transaction also copies a visible database row incarnation into the corresponding look-aside list 108a-n. To determine if the row was read within the same transaction twice, a determination is made whether the user's USN matches the USN stored in the copy of the row. If the user's USN matches the USN stored in the copy of the row, it can be assumed that no new transaction was initiated by the user, because the user would have incremented its USN had the user initiated another transaction. When one of snapshots 116 is copied from short term memory 112, the current value of a given one of USNs 104a-n is stored in a row cache working set entry (e.g., with the user's look aside lists 108a-n). If the row is referenced again within the same transaction (i.e., if the one of USNs 104a-n stored in its one of look aside lists 108a-n matches the current value of the one USNs 104a-n corresponding the current process), there is no need to copy the data from storage space 113, because the data in the one of look aside lists 108a-n is still valid, and the transaction is still the same transaction that copied the data last. Therefore, the visible copy of the row is returned from the working set list, avoiding a search for the snapshot.

Snapshot Chains

Snapshots 116 are arranged in a unidirectional snapshot chain in which the most recent snapshot is placed at the head of the snapshot chain. In an embodiment, each of slots 114 includes zero snapshot chains or one snapshot chain. In an embodiment, the snapshots 116 are explicitly linked directly from one row to the location of the chronologically next row in the snapshot chain. For example, in each snapshot chain, each snapshot is linked to the next oldest snapshot by a pointer. In an embodiment, the links formed by the pointers go in only one direction, starting at the newest modification to the row and ending at the oldest stored modification to the row. The snapshot chains are searched from the newest to the oldest snapshot (in the direction of the links). These unidirectional snapshot chains of links will be referred to in this specification as a single linked snapshot chains. In an embodiment each snapshot in a chain is linked directly to the next snapshot in the chain instead of linking one snapshot page to the next snapshot page. In other words, the link is explicitly placed in the snapshot rather than in a snapshot page. The explicit linking of the snapshots allows the snapshot chains to be searched more quickly than various other forms of snapshot chains, and does not require additional database structures or locking mechanisms.

When inserting a snapshot into the snapshot chain, the newest entry is added to the head of the snapshot chain. In an embodiment, once the oldest snapshot in the snapshot chain becomes old enough it may be discarded. Discarding the oldest snapshot effectively shortens the snapshot chain. Since snapshot chains are unique to a single database row (though many modification instances of the row may be in the snapshot chain), the number of database structures (physical storage units, such as database pages or blocks, that may contain multiple unique database rows) that need to be added are fewer. Additionally, the coordination and locking requirements of the snapshot chains are less than other types of linking structures used. Since the single linked snapshot chains can be stored and accessed quicker than other snapshot chains, transactions do not take as long and therefore the snapshot chains do not need to be stored for as long as a period of time reducing the likelihood of clogging short term memory 112.

In an embodiment, no limit or essentially no limit is set for the length of snapshot chain. If the snapshot chain becomes exceedingly long, and clogs short term memory 112, one or more of the snapshot chains stored in storage space 113 are copied to long term memory 118. Long term memory 118 will be discussed further below.

Clogged Flag

Clogged flag 117 is a global flag that indicates that there is no more room in short term memory 112 that is available for storing new snapshots. Clogged flag 117 is set to a particular value to indicate that there is no room available in short term memory 112 for a new snapshot. In an embodiment, if clogged flag 117 is set, then searches for space in short term memory 112 are not performed. In an embodiment in which storage space 113 has a fixed size, clogged flag 117 indicates that storage space 113 is full. If storage space 113 has a variable size, then in one embodiment, clogged flag 117 indicates that there is no more room in short term storage 112 for expanding storage space 113 and that storage space 113 is full.

Long Term Memory

Long term memory 118 may be persistent media-based storage such as nonvolatile memory, which may include one or more magnetic, optical, and/or magneto optical disk drives and/or other forms of long term memory. The time required for one of users 102a-n to access long term memory 118 is longer than the time required to access short term memory 112. Long term memory 118 may not need to be used if short term memory 112 is large enough.

Storage space 120 is a region in long term memory 118 for storing snapshots. When storage space 113 fills up, if there is no more room in short term memory 112 for expanding storage space 113 and if there is no reclaimable space in storage space 113, storage space 113 is clogged. If storage space 113 is clogged, snapshots are stored in storage space 120 in long term memory 118. If there is no more room or reclaimable space in short term memory 112 for storing snapshots, and one or users 102a-n needs to write a snapshot to a snapshot chain in one of slots 114, the entire snapshot chain is copied from short term memory 112 to storage space 120 in long term memory 118, so that the new snapshot can be easily added to the head of the snapshot chain. If clogged flag 117 is set to indicate a clog, then the new snapshot may be stored in long term memory 118 without searching for empty or reclaimable space in short term memory 112.

DBMS

DBMS 122 stores and retrieves rows from a database. Users 102a-n may send instructions (e.g., database statements, such as SQL statements) to DBMS 122 when users 102a-n desire to access rows stored in the database. DBMS 122 then establishes transactions, such as read-only transactions and read-write transactions to read, modify, or otherwise access database rows, which may access storage space 113. In an embodiment, DBMS 122 uses read-only transactions for reading a row and read-write transactions for modifying a row. In an alternative embodiment, users 102a-n may also send instructions to DBMS 122 in order to access storage space 113. In an alternative embodiment, DBMS 122 may be fully or partially distributed among users 102a-n, and users 102a-n alone or in conjunction with DBMS 122 also access rows. DBMS 122 may check for reclaimable space in storage space 113 and add new slots to storage space 113. DBMS 122 may reclaim and allocate space within short term memory 112 to slots 114.

Snapshot handler 124 is the one or more portions of DBMS 122 that handle snapshots 116 and related matters, such as managing short term memory 112 and/or storage space 113. For example, snapshot handler 124 may store snapshots 116, create slots 114, reclaim storage space in storage space 113, expand storage space 113, decide whether a snapshot should be stored in short term memory 112 or long term memory 118, and/or a snapshot chain should be moved from short term memory 112 to long term memory 120. In an embodiment, snapshot handler 124 includes RCS 126. In an embodiment, RCS 126 is the portion of row handler 122 that manages storage space 113. RCS 126 monitors storage space 113 to determine when storage space 113 is clogged, and searches for reclaimable space in storage space 113. RCS 126 may be a daemon process associated to an open database that is responsible for various tasks such as writing modified rows from short term memory to the on-disk database structure. During the rest of the specification, by way of example, at various places various operations or attributes will be attributed to users 102a-n, DBMS 122, row handler 124, and RCS 126. However, it should be understood that the present invention is not limited to performing these operations by these entities or these entities possessing these attributes.

Writing to a Row

In an embodiment, when a read-write transaction accesses a row, the "live" row in short term memory 112 (not a snapshot copy of the row) is coordinated between read-write users by locking the row to prevent multiple users from trying to modify a row at the same time. A read lock is granted to the one of users 102a-n for whom the read-write transaction is being performed. The read lock is maintained until either the read-write transaction is ready to modify the row, in which case a write lock is requested, or the read-write transaction commits, in which case the read lock is given up. Alternatively, a read lock is granted when a read-write transaction needs to read a row, and the lock is given up when the row is read prior to reading next row of interest. By giving up the read lock, another transaction can modify the row that was read prior to the read-write transaction committing. The live row, once updated, contains a pointer to the current head of the snapshot chain.

In an embodiment, an atomic read mechanism of the live row permits a read-write user to make an update to the row, which may be a non-atomic event, because it takes a number of memory writes to complete the actual update. If it is necessary to move all existing snapshots 116 to long term memory 118 from storage space 113, after snapshots 116 are copied to long term memory 118, the rows in the database are updated with pointers to the new head of the snapshot chain in long term memory 118. This last update is deferred as long as possible to give the read-only users as long as possible to keep using the snapshot chain in memory.

In an embodiment, when a read-write transaction is initiated, one or more of slots 114 are reserved for writing snapshots. Storage space 113 is checked for slots that are either empty or associated with read-write transactions that have committed (e.g., the youngest snapshot is older than any active read-write transaction). When one of users 102a-n needs to write to a row of a database, a snapshot is made of the row. In an embodiment, if a slot already exists in short term memory 112 for that row, and if there is still more room in short term memory 112, the new snapshot is stored in the designated one of slots 114 at the head of the snapshot chain. However, if there is no slot already designated for the row, then the snapshot is written to an empty one of slots 114 or to a reclaimable slot (a slot whose youngest snapshot is older than the oldest active read-write transaction).

When a location for storing a snapshot within one of slots 114 is found, the read-write transaction may determine that one or more entries at the tail of one or more snapshot chains are old enough that the entries may be discarded (e.g., the entries are older than the oldest read-only transaction that has not yet committed). Accordingly, the read-write transaction may write the new snapshot in a location that presently contains one or more snapshots that can be discarded. In an embodiment, if there are no empty slots in storage space 113, then storage area may be expanded and new slots are added and/or any reclaimable storage space is storage space 113 is reclaimed. In an embodiment, when a read-write transaction needs to store a snapshot in short term memory 112, it uses the next available slot of slots 114 that the read-write transaction reserved within the short term memory 112. The number of the slots that are reserved may be stored in a list referred to as a reserve list. If the reserved list is empty or no reserved list exists, another group of slots is reserved for the user (the one of users 102a-n) that "owns" the transaction (the user that "owns" the transaction is the user that sent the instructions to DBMS 122 that created the transaction). If there is no more room in short term memory 112 and no reclaimable storage space is short term memory 112, the new snapshot is written to storage space 120 in long term memory 118. If there is already a slot for the row, but there is no more room or reclaimable space in short term memory 112 for the new snapshot, then the entire snapshot chain (e.g., the entire contents of or substantially all the slot containing the snapshot chain) is copied to storage space 120, and the new snapshot is placed at the head of the snapshot chain.

For example, in an embodiment, when a row is requested from the database, the DBMS 122 first checks to see if the requested table or index is mapped to an existing row in short term memory 112. If a row in short term memory 112 is mapped to the table or index, DBMS 122 then checks to see if the requested row is in short term memory 112. If the row is found in short term memory 112, the row is retrieved directly from short term memory 112. As an aside to understand what happens if the row is not in short term memory 112, a buffer is a group of one or more database pages. A buffer pool is a collection of one or more database buffers that are currently stored in short term memory 112. A buffer pool is allocated to allow holding two or more buffers in short term memory 112. Each Input/Output (I/O) operation to the database is between a buffer and the long term memory where the database is stored, which may be long term memory 118 or another long term memory. Since the buffer pool is limited in size, it can contain only a finite number of buffers at once. Consequently, if the desired row is not in short term memory 112, DBMS 122 checks the page buffer pool. If the row is not in the buffer pool, DBMS 122 performs disk I/O to retrieve the row. The requested row is then inserted into short term memory 112.

When a modification is made to a row in short term memory 112, if the original database page containing the row is locked for an update in the process' page buffer pool, the modified data is written back to the database and to short term memory 112. However, if the original database page is not locked for update or is not found in the process' buffer pool, the modification is made and stored directly into short term memory 112 without incurring database I/O or page locking. Multiple rows in short term memory 112 can be active for a database. A row in short term memory 112 is available to, and shared by all users 102*a-n* (e.g., processes) connected to the database.

Semaphores are not necessary and no locking is needed by read-write transactions, because all inserts into the snapshot chain are at the head of the snapshot chain prior to updating the database row itself. Since locking and semaphores are not necessary when inserting snapshots 116 into their single linked snapshot chains, concurrency can be improved. Multiple threads of execution can scan the same, or different, snapshot chains simultaneously. Additionally, inserting a snapshot into, or searching a snapshot chain stored entirely within short term memory 112 improves performance.

Transaction Sequence Numbers

Snapshots 116 are labeled with a Transaction Sequence Number (TSN) value, which facilitate keeping track of the relative age of snapshots 116 and transactions. Read-write transactions are assigned the next ascending value for a database-wide TSN when the transaction is initiated. In an embodiment, TSNs are assigned values sequentially, in ascending order, as they are issued. Consequently, the lowest valued TSN is usually the "oldest" TSN.

The next TSN to be assigned will be referred to as the "cutoff" TSN. The cutoff TSN is higher than any assigned TSN. The TSNs having values that are greater than or equal to the oldest active TSN and less than the cutoff TSN constitutes all of the existing active transactions. The list of all existing active read-write transactions will be referred to as the Active Writer List (AWL). Read-only transactions are assigned the TSN of the oldest read-write transaction that is in the database at the time that the Read-only transaction starts. When the read-only transaction is initiated, the read-only transaction captures not only the TSN of the oldest active transaction, but also the value of the cutoff TSN and the AWL. The use of the AWL is discussed later in the section entitled "Reading a Row".

Each row in the database has as an associated TSN of the most recent transaction to modify the row. Prior to modifying a row, a read-write transaction stores the existing row (with the existing TSN value) in a storage space 113. By storing the TSN with the rows and snapshots, a read-only transaction can evaluate the TSN of a database row or snapshot to determine if the incarnation of the row (e.g., the row or a snapshot of the row) existed prior to the start of the read-only transaction. Specifically, if the TSN of a row or snapshot has a value that is greater than the TSN of the transaction, then row or snapshot is not visible. If the TSN of a row or snapshot has a value that is less than the TSN of the transaction, then row or snapshot is visible.

Thus, whether contents of the row or snapshot are considered visible to a read-only transaction may be checked by checking if the row incarnation (e.g., a row or snapshot of the row) existed when the read-only transaction began, as indicated by comparing the TSN of the row or snapshot to the TSN of the read-only transaction.

An Overview of the Storage of Snapshots

Figure 2:
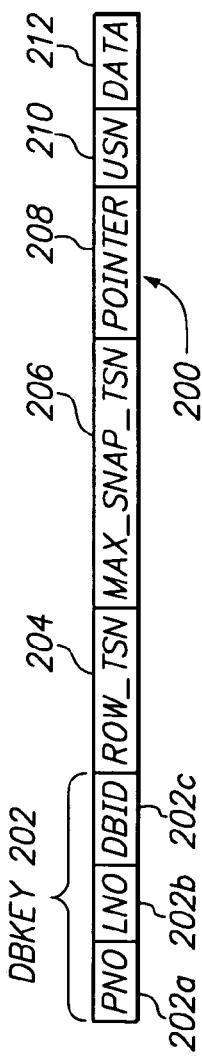
FIG. 2 is block diagram of a snapshot.

FIG. 2 is a block diagram of a snapshot 200. Snapshot 200 includes Database Key (DBKEY) 202 having Page Number (PNO) 202*a*, Line Number (LNO) 202*b*, and Database Identification DBID 202*c*. Snapshot 200 also includes ROW_TSN 204, MAX_SNAP 206, pointer 208, USN 210, and data 212. In alternative embodiments, snapshot 200 may not have all of the components listed above or may have other components in addition to and/or instead of the components listed above.

Snapshot 200 may be any of snapshots 116. In an embodiment, snapshots 116 each have the same structure as snapshot 200. DBKEY 202 is a unique database key for looking up a particular row in a database. The full DBKEY 202 is may be made up of a "Line" Number (LNO) 202*a*, "Page" number (PNO) 202*b*, and a Database Identification (DBID) 202*c*.

The LNO 202*a* is a "line" number on a database page. Each database page may contain zero or more "lines". A database row may be made up of one or more lines. PNO 202*b* is a "page" number within a storage area, which may be a portion of storage space 113. Each storage area contains some number of pages. The size of the storage area may be extended by adding more pages to the storage area at run time. For example, each storage area may be limited to about 2.1 billion pages, and each page may be limited to 65535 bytes. Also as an example, if the row is larger than the size of a database page, the row may be fragmented onto multiple pages and the fragments concatenated together when the row is read. DBID 202*c* is a database identification number of that is unique to the storage area. There can be one or more storage areas in the database.

ROW_TSN 204 is the TSN of the snapshot 200, which is the TSN of the last transaction to modify the row, and which in an embodiment may be stored with the row in the database. ROW_TSN 204 is used by a read-only transaction to determine if snapshot 200 is visible. A read-only transaction needs to know the ROW_TSN (e.g., ROW_TSN 204) when traversing a snapshot chain of snapshots to know if a particular copy of the row (e.g., snapshot 204) is visible or not, by whether the ROW_TSN is less than or equal to the TSN of the read-only transaction. The read-only transaction reads the snapshot chain, one snapshot at a time, until finding the first one with a TSN indicating that the snapshot is the visible.

MAX_SNAP 206 is the TSN of the transaction that created snapshot 200. For example, if a first read-write transaction, having a TSN equal to 10 modifies a row in which DBKEY 202 has the value 24, then row 24 has a ROW_TSN 204 that has a value of 10. If now a new read-write transaction having a TSN equal to 100 wants to access row 24, TSN 100 makes a snapshot of row 24 (e.g., snapshot 200). The value of ROW_TSN 204 for the snapshot 200 is 10, and the value of MAX_SNAP_TSN 206 of the snapshot 200 is 100. Snapshot 200 cannot be discarded until there are no active transactions that are as old as MAX_SNAP_TSN 206, which in the example is a TSN of 100. Once there are no transactions that are as old as one have a TSN of 100 that are active, there are no transactions that need to read the snapshot. Assuming that TSNs are given out in ascending order, once there are no more active transactions with TSNs smaller than or equal to 100, snapshot 200 may be discarded. Thus, MAX_SNAP_TSN 206 is used to determine if snapshot 200 is no longer needed by any existing database transaction and could thus be discarded, while in contrast ROW_TSN 204 is used to determine whether snapshot 200 is visible.

Pointer 208 points to the next snapshot in the snapshot chain to which snapshot 200 belongs, and is used in forming the unidirectional snapshot chain. Each pointer contains the index of the next entry in the snapshot chain for this database key. USN 210 is the one of USNs 104*a-n* that corresponds to the one of users 102*a-n* that made snapshot 200. Data 212 is the data associated with the copied row from which snapshot 200 was derived.

Reading a Row

In an embodiment, read-only transactions are only allowed to read rows that have not been modified or that have been modified by other transactions that have already committed. Additionally, read-only transaction are provided an ACID consistent view of the database. In an embodiment, a lock is not placed on a row or snapshot when a read-only transaction reads a snapshot. In order to provide an ACID consistent view of the database within a transaction, when reading a row from the database, read-only transactions may only see database modifications from transactions that committed prior to the start of the read-only transaction. In other words, a row that was modified after the start of the read-only transaction or was in the process of being modified is not visible to the read-only transaction. Since the newest entry is inserted at the head of the snapshot chain, a read-only transaction, in search of the first visible snapshot, scans the in-memory snapshot chain from the newest to oldest entry by following pointers in the direction that the pointers are linked.

Although read-write transactions are assigned TSNs sequentially, each read-write transaction may take a different duration of time to commit. Consequently, there may be some read-write transactions that have committed and some read-write transactions that have not committed with TSN values between the oldest TSN value and the cutoff TSN value. When a row is fetched from the database, the read-only transaction compares the TSN stored in association with the database row (ROW_TSN 204) with the oldest TSN and cutoff TSN at the time the read-only transaction began. If the row incarnation (row or snapshot) existed when the read-only transaction started, the row contents are considered "visible" to the read-only transaction and can be returned to the user. If the row incarnation was modified after the read-only transaction began or if the row incarnation was modified by a read-write transaction that was active at the time that the read-only transaction began, it is not visible to the read-only transaction. If the row incarnation is not visible, the read-only transaction searches backwards (i.e., the DBMS 122 or row handler 124 searches from the newest to the oldest row) through the snapshot chain of the row until the first incarnation of the row is found that is visible to the read-only transaction. This copy of the row is returned to the user.

In other words, if the row incarnation (e.g., a row or snapshot of the row) was modified after the read-only transaction began, since the row or snapshot is not visible to the read-only transaction, and the DBMS 122 or row handler 124 searches backwards (i.e., from the newest to the oldest row) through the snapshot chain of the row until the first incarnation of the row (e.g., the first snapshot of the row) is found that is visible to the read-only transaction. The first visible incarnation of the row (e.g., the row or the first snapshot of the row) in the snapshot chain is returned to the user.

An optimization for determining whether a given row is visible is facilitated by storing the oldest TSN and the cutoff TSN (in addition to the AWL) in association with the read-only transaction. In this optimization, the algorithm first checks if the TSN of the row (e.g., ROW_TSN 204) has a value that is greater than the cutoff TSN or less than the oldest TSN. If the ROW_TSN 204 is older than the oldest TSN, the row incarnation is visible. If the ROW_TSN 204 is younger than the cutoff TSN, the row incarnation is not visible. Thus, by storing the oldest TSN and the cutoff TSN, often a determination may be made as to whether a row is visible, without comparing ROW_TSN 204 to every active TSN in the AWL.

If the ROW_TSN 204 is younger than the oldest TSN and older than the cutoff TSN, the AWL is searched to find the TSN value stored in ROW_TSN 204. If the AWL contains a TWN having the same value as ROW_TSN 204, then the row incarnation was modified by a read-write transaction that was active at the time the read-only transaction started, and therefore is not visible to the read-only transaction. If the AWL does not contain ROW_TSN 204, then the row incarnation was not modified by a read-write transaction that was active at the time the read-only transaction started. Since ROW_TSN 204 was already established to also be older than the cutoff TSN, therefore the row incarnation is visible to the read-only transaction. Since snapshots in short term memory are not altered once written unless short term memory 112 is clogged or the snapshot is too old to be useful, no locking is needed by read-only transactions searching a snapshot chain.

Allocation and Reclamation

Management and reclamation of space in the storage space 113 for snapshots is implemented by RCS 126, via the TSN values. The TSN value is used by RCS 126 to determine when a snapshot or snapshot chain is old enough that the snapshot or snapshot chain may be discarded. Read-write transactions are assigned the next ascending value for a database-wide TSN when the transaction is initiated. RCS 126 compares the TSNs of the oldest read-write transaction and read-only transactions may be compared to the TSNs of the snapshots or snapshot chains to determine if the snapshots or snapshot chains can be discarded. Since an empty slot may be identified more quickly than a reclaimable slot, therefore before reclaiming slots, a search is performed for empty slots.

To reduce contention in short term memory 112, RCS 126 allocates groups of slots 114. In an embodiment, slots 114 may be reallocated by renumbering them. Transactions in progress need not be interrupted, because the numbering of the slots 114 can be changed without affecting transactions that are in progress. However, storage space 113 is locked prior to starting the allocation process, which may be referred to as an allocation lock. In an embodiment in which storage space 113 has a variable size, if the allocation process may result in a storage area of a different size, a larger portion of or all of short term memory 112 may be locked. The allocation lock prevents new transactions from accessing slots 114 and does not disrupt transactions in progress. RCS 126 uses a global cursor to traverse slots 114 that were previously created. Starting at the current global cursor position, slots 114 are evaluated one at a time in an ascending order (wrapping back to the starting slot number at the end of the short term memory) to see if any of the slots 114 that were already created are free for use. In an embodiment, a slot is considered free for use if:

(1) the slot has a null value in the field for DBKEY 202 (and therefore the fields for DBID 202*a*, PNO 202*b*, and LNO 202*c* have null values); or (2) the MAX_SNAP_TSN 206 of the slot is older than any current database transaction (e.g., has a higher value than the TSN of the transaction) and the slot has a non-zero DBKEY 202.

If the slot being considered (the slot having the cursor) is free, it may be claimed by an application of users 102*a-n* holding the allocation lock by setting DBKEY 202 such that LNO 202*b* is equal to the Transaction ID (TID). When a process of one of users 102*a-n* connects to the database, it is assigned a unique "TID" value. Thus, by setting the LNO 202*b* to the TID value, the process that "reserved" the free space on a database page can be identified. The PNO 202*a* and DBID 202*c* fields may be set to zero indicating that the space is empty (although reserved). Setting the DBKEY 200 fields in this fashion prevents other applications of users 102*a-n*, which use the above two criterion to determine if the slot is in use, from allocating to this application to those of slots 114 that are already reserved. Also, setting the DBKEY 200 fields in this fashion permits a database recovery process to identify those of slots 114 that are owned by a failed application (e.g., an application that terminated abnormally) belonging to one of users 102*a-n*, because eventually the MAX_SNAP_TSN 206 of a slot allocated to a failed application will be older than any current database transaction. Once a slot that is allocated to a failed application (of one of users 102*a-n*) has been identified, DBMS 122 clears the slots associated with the failed applications, so that the slots of the failed applications are available for use by other applications of users 102*a-n*.

Once the specified number of slots 114 has been reserved, the global cursor is updated to contain the number of the next slot that has not been allocated to any applications of users 102*a-n*. Future searches will begin at the new position of the global cursor. Finally, the short term memory 112 or storage space 113 is unlocked.

The snapshot chains are generally, but not always, placed in the slots 114 in the order of their age. By assuming that the snapshot chains are located in the slots 114 in age order, a First In First Out (FIFO) technique may be used for updating slots 114 in storage space 113. In other words when searching for reclaimable slots, the slots are searched sequentially in the order in which they were allocated starting from the slot that was allocated first. This sort of FIFO technique is referred to in this specification as a lazy FIFO technique, because the oldest used snapshot chains of slots 114 tend to be, but are not necessarily, the next evaluated for re-use. So long as the oldest transaction in the database has already committed, at least some of the space evaluated should be reclaimable, because the oldest transactions no longer need to be stored. Therefore, the space occupied by the oldest snapshots may be used by other snapshots.

The more slots that are allocated during each allocation, the less frequently, the allocations need to be performed. The less frequently the allocation is performed, the less frequently storage space 113 needs to be locked. Consequently, by reserving several slots more than the minimum necessary to accommodate each active snapshot chain during each allocation process, contention for short term memory 112 is reduced.

Positive and Negative Valued Pointers

In an embodiment, to facilitate keeping track of whether a particular snapshot is stored in short term memory 112 or long term memory 118, a positive valued pointer or zero valued pointer is used for a snapshot pointer (pointer 208) if pointer 208 points to a page in storage space 120 (in long term memory 118) and the location in storage space 120 where the pointer 208 points is live. Similarly, a negative valued pointer 208 is used if the absolute value of pointer 208 points to one of slots 114 in short term memory 112. Thus, whether the next snapshot to be searched will be found in short term memory 112 or long term memory 118 is indicated by the sign of pointer 208. In an alternative embodiment positive pointer indicates storage in short term memory 112 and a negative pointer indicated storage in long term memory 118.

In an embodiment, each snapshot chain may exist entirely within short term memory 112 (e.g., in storage space 113), or may link from short term memory 112 to long term memory 118 (e.g., in storage space 120). In an embodiment, the snapshot chain cannot, however, link from long term memory 118 back to short term memory 112, because snapshot chains are not moved back to short term memory 112 once in long term memory 118.

Handling a Clogged Snapshot Storage Area

When a read-write transaction is unable to allocate space in storage space 113 of short term memory 112 (indicating that there are no reclaimable slots), the read-write transaction is responsible for writing the entire snapshot chain to long term storage 118 (in storage space 120) prior to storing the new snapshot. The new snapshot and the associated snapshot chain need to be stored in storage space 120 of long term storage 118.

Since the newest snapshot must be placed at the head of the snapshot chain, and since short term memory 112 is full, the only way to keep the head of the snapshot chain in short term memory is to erase snapshots at the end of the tail of the snapshot chain in order to make room for the new snapshot that goes at the head. However, that requires placing a lock on part of the snapshot chain, which would create contention and slow down read-only transactions. Additionally, if a read-only transaction is in the middle of searching the snapshot chain, it would have to be stopped from searching the snapshot chain or otherwise synchronized with the read-write transactions so that the read-only transaction does not read a snapshot while it is being changed to a different snapshot or miss a snapshot in the snapshot chain.

If the live row in short term memory 112 contains a positive valued snapshot pointer (representing a pointer to storage space 120 in long term memory 118), a snapshot chain in long term memory 118 already exists, and the snapshot chain in long term memory 118 is updated by inserting the new snapshot at the head of the snapshot chain. If the pointer of the live row is negative (indicating a pointer into the snapshot short term memory 112), since short term memory 112 is full, the existing snapshot chain in short term memory 112 is copied to long term memory 118 and the new copy of the chain in long term memory is updated by adding the new snapshot at the head of the snapshot chain. Since the snapshot chain is always searched from newest to oldest until a visible row copy is found, the copy of the snapshot chain written to long term memory 118 must as well be written linked from newest to oldest.

When searching a snapshot chain in short term memory 112, the traversal is terminated when any of the following is true:

(1) a positive snapshot pointer is encountered (referring to a snapshot page number), because the snapshot chain either needs to be moved or has been moved to long term memory;

(2) a DBKEY is found in the snapshot short term memory other than the referenced DBKEY (indicating that the snapshot chain had been previously truncated by another user storing a snapshot row for another database row, or the slot has been reclaimed and is now reserved), and that the list is no longer valid; or (3) a MAX_SNAP_TSN is found that is older than the current oldest database transaction TSN, because the list is out of date.

After the entire snapshot chain has been stored in long term memory 118, the live snap shot copy in short term memory 112 is updated with a snapshot pointer pointing to the snapshot page having head of the snapshot chain in long term memory 118. Future searches of this snapshot chain will follow the live short term memory slot positive value for the snapshot pointer and will search long term memory 118, in the snapshot storage area. Once it becomes necessary to move a snapshot chain to long term memory 118, a global short term memory clogged flag 117 is set as a sentinel to other processes so that they can avoid initiating further fruitless searches of the short term memory looking for reclaimable space.

In addition, RCS 126 of DBMS 122 is notified that the snapshot short term memory 112 is full. The RCS 126 monitors the oldest active transaction TSN value for a change. When the oldest active TSN changes (indicating that there is a newer oldest TSN), a search of the short term memory 112 is initiated to determine if any of slots 114 are reclaimable. If any of slots 114 are reclaimable, RCS 126 clears the global short term memory clogged flag 117 indicating to users that space is now available in short term memory 112, and the user processes are again able to reserve slots.

In an alternative embodiment, RCS 126 process analyzes the storage space 113, and then when storage space 113 has over a predetermined percentage of nonreclaimable slots 114, the tails of the snapshot chains may be copied from short term memory 112 to long term memory 118 and then the corresponding portions of storage space 113 is emptied.

Hardware Overview

Figure 3:
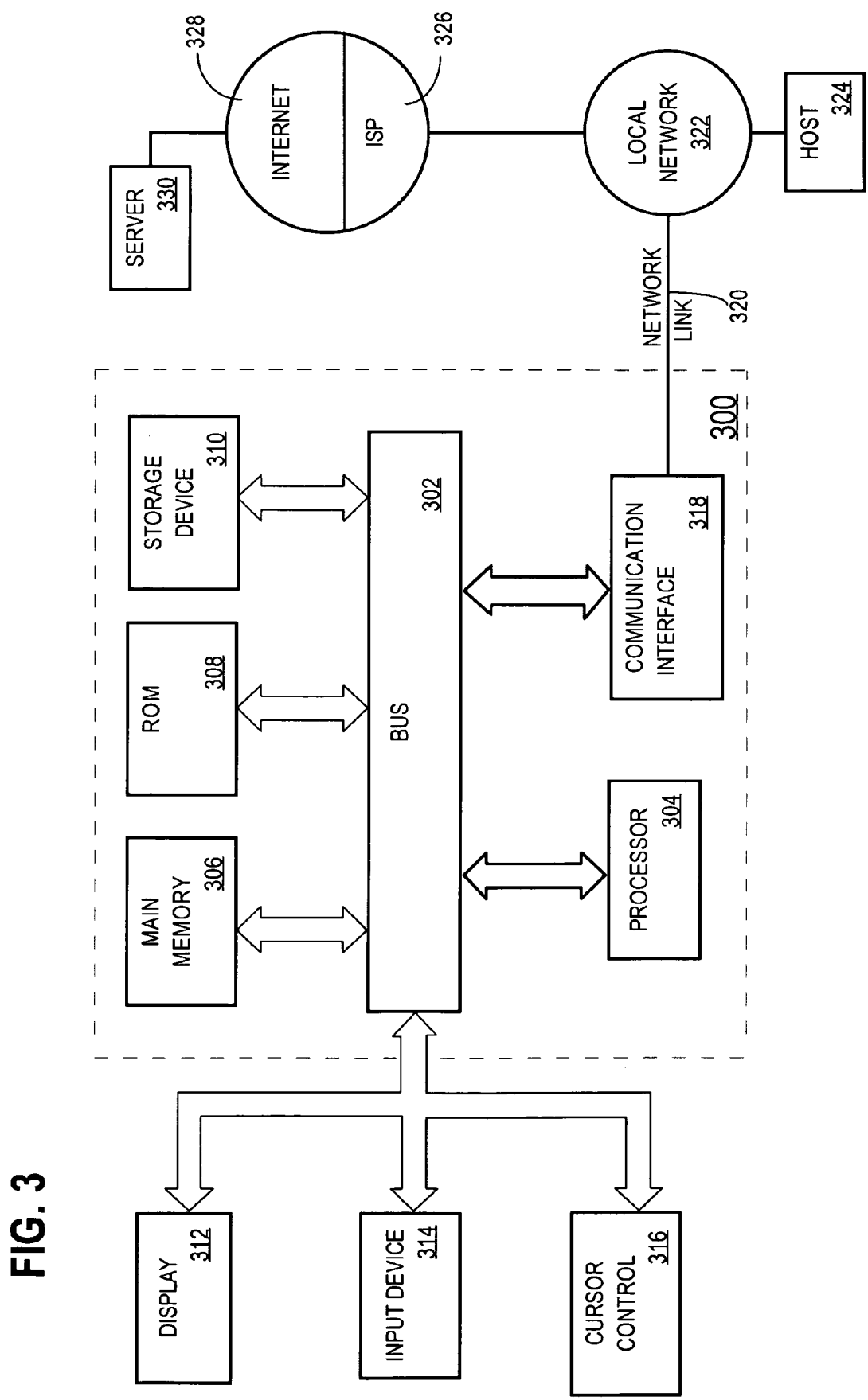
FIG. 3 is a block diagram that illustrates a computer system upon which an embodiment of the present invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read-only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for storage of multiple snapshots 116 in short term memory 112. According to one embodiment of the invention, storage of multiple snapshots 116 in short term memory 112 is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for storage of multiple snapshots 116 in short term memory 112 as described herein.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed:

1. A machine-implemented method for a database server managing pre-modification copies of data comprising the steps of:

a first transaction of a process making a modification to a record, wherein the first transaction is a transaction that is required to modify the record;

wherein the process and one or more other processes of a Database Management Server (DBMS) share access to a first memory;

prior to the first transaction making the modification, causing a copy of said record to be stored as a snapshot in either a first portion of the first memory or a second portion of a second memory in association with one or more other snapshots of said record;

wherein the first memory comprises a first type of memory and the second memory comprises a second type of memory and wherein the first type of memory can be accessed more quickly by said DBMS than the second type of memory;

wherein if a second transaction was initiated prior to completion of the first transaction, and if the second transaction requires access to the record, the second transaction accesses the snapshot, wherein the second transaction does not modify the record;

wherein the step of causing a copy of said record to be stored includes determining whether there is space available in a portion of said first memory to store said snapshot;

if there is space available in said first portion of said first memory to store said snapshot, then storing said record in the first portion of said first memory; and if there is no space available in said first portion of said memory, then storing said snapshot and said one or more other snapshots in said second portion.

2. The method of claim 1, wherein the one or more other snapshots are linked in a snapshot chain, and wherein the step of causing a copy of said record to be stored comprises the step of:

adding the snapshot to the snapshot chain.

3. The method of claim 2, wherein the step of storing said snapshot and said one or more other snapshots in said second portion comprises copying the snapshot chain in its entirety to the second memory prior to adding the snapshot.

4. The method of claim 2, wherein the snapshots in the snapshot chain are linked in chronological order.

5. The method of claim 2, wherein the method further comprises the step of reserving a plurality of slots in the first memory for storing snapshot chains at a future time when a need for the slots arises.

6. The method of claim 1, wherein the record includes a pointer pointing to a previous snapshot of the record; and wherein the pointer has a first sign if the previous snapshot is stored in the first memory, and has a second sign if the previous snapshot is stored in the second memory.

7. The method of claim 1, further comprising the step reclaiming portions of the first memory in which snapshots are stored that are older than any active read-only transaction that has not committed.

8. The method of claim 7, wherein the first transaction performs step of reclaiming, wherein the step of reclaiming is performed in response to a determination, by the step of determining, that there is no space available in the first portion of the first memory.

9. The method of claim 7, wherein the first transaction performs the step of reclaiming, the method further comprising the step of locking the first portion prior to the step of reclaiming, and therein allowing the first transaction to reallocate slots of the first portion.

10. The method of claim 1, further comprising the step of the process reserving empty slots for later use.

11. The method of claim 1, further comprising the steps of:
  detecting that no room exists in a portion of the second memory reserved for snapshots;
  in response to the step of detecting that no room exists, searching for reclaimable portions of the second memory.

12. The method of claim 1, further comprising
  associating a transaction sequence number with the second transaction;
  storing a transaction sequence number with the snapshot;
  comparing the transaction sequence number of the snapshot and the transaction sequence associated with the second transaction; and
  determining whether the second transaction is allowed to view the snapshot based on the step of comparing.

13. The method of claim 1, further comprising the steps of:
  storing a transaction sequence number with the snapshot, wherein the transaction sequence number is associated with the first transaction; and
  determining whether the snapshot can be discarded based on the transaction sequence number.

14. The method of claim 1, further comprising the step of: if there is no space available in the first portion, setting an indication that the first portion is full.

15. The method of claim 1, wherein the step of setting is performed after determining that:
  the first portion is full; and
  the first portion does not have any reclaimable space.

16. The method of claim 1, wherein said first type of memory is a volatile memory and said second type of memory is non-volatile memory.

17. A machine-readable storage medium carrying one or more sequences of instructions, which when executed by one or more processors, causes the one or more processors to perform a method comprising the steps of:
  a first transaction of a process making a modification to record, wherein the first transaction is a transaction that is required to modify the record;
  wherein the process and one or more other processes of a Database Management Server (DBMS) share access to a first memory;
  prior to the first transaction making the modification, causing a copy of said record to be stored as a snapshot in either a first portion of the first memory or a second portion of a second memory in association with one or more other snapshots of said record;
  wherein the first memory comprises a first type of memory and the second memory comprises a second type of memory and wherein the first type of memory can be accessed more quickly by said DBMS than type of memory;
  wherein if a second transaction was initiated prior to completion of the first transaction, and if the second transaction requires access to the record, the second transaction accesses the snapshot, wherein the second transaction does not modify the record;
  wherein the step of causing a copy of said record to be stored includes
    determining whether there is space available in a portion of said first memory to store said snapshot;
    if there is space available in said first portion of said first memory to store said snapshot, then storing said record in the first portion of said first memory; and
    if there is no space available in said first portion of said memory, then storing said snapshot and said one or more other snapshots in said second portion.

18. The machine-readable storage medium of claim 17, wherein the one or more other snapshots are linked in a snapshot chain, and wherein the step of causing a copy of said record to be stored comprises the step of:
  adding the snapshot to the snapshot chain.

19. The machine-readable storage medium of claim 18, wherein the step of storing said snapshot and said one or more other snapshots in said second portion comprises copying the snapshot chain in its entirety to the second memory prior to adding the snapshot.

20. The machine-readable storage medium of claim 18, wherein the snapshots in the snapshot chain are linked in chronological order.

21. The machine-readable storage medium of claim 17, wherein the method further comprises the step of reserving a plurality of slots in the first memory for storing snapshot chains at a future time when a need for the slots arises.

22. The machine-readable storage medium of claim 17, wherein the record includes a pointer pointing to a previous snapshot of the record; and wherein the pointer has a first sign if the previous snapshot is stored in the first memory, and has a second sign if the previous snapshot is stored in the second memory.

23. The machine-readable storage medium of claim 17, wherein the method further comprises the step reclaiming portions of the first memory in which snapshots are stored that are older than any active read-only transaction that has not committed.

24. The machine-readable storage medium of claim 23, wherein the first transaction performs step of reclaiming, wherein the step of reclaiming is performed in response to a determination, by the step of determining, that there is no space available in the first portion of the first memory.

25. The machine-readable storage medium of claim 23, wherein the first transaction performs the step of reclaiming, the method further comprising the step of locking the first portion prior to the step of reclaiming, and therein allowing the first transaction to reallocate slots of the first portion.

26. The machine-readable storage medium of claim 17, wherein the method further comprises the step of the process reserving empty slots for later use.

27. The machine-readable storage medium of claim 17, wherein the method further comprises the steps of:
  detecting that no room exists in a portion of the second memory reserved for snapshots;
  in response to the step of detecting that no room exists, searching for reclaimable portions of the second memory.

28. The machine-readable storage medium of claim 17, wherein the method further comprises the steps of:
  associating a transaction sequence number with the second transaction;
  storing a transaction sequence number with the snapshot;
  comparing the transaction sequence number of the snapshot and the transaction sequence associated with the second transaction; and
  determining whether the second transaction is allowed to view the snapshot based on the step of comparing.

29. The machine-readable storage medium of claim 17, wherein the method further comprises the steps of:

storing a transaction sequence number with the snapshot, wherein the transaction sequence number is associated with the first transaction; and determining whether the snapshot can be discarded based on the transaction sequence number.

30. The machine-readable storage medium of claim 17, wherein the method further comprises the step of:

if there is no space available in the first portion, setting an indication that the first portion is full.

31. The machine-readable storage medium of claim 17, wherein the step of setting is performed after determining that:

the first portion is full; and the first portion does not have any reclaimable space.

32. The machine-readable storage memory of claim 17, wherein said first type of memory is a volatile memory and said second type of memory is non-volatile memory.

* * * * *